US012429807B2

(12) United States Patent
Luke et al.

(10) Patent No.: US 12,429,807 B2
(45) Date of Patent: Sep. 30, 2025

(54) CLUTCH ACTUATION BETWEEN POSITIONS

(71) Applicant: Hewlett-Packard Development Company, L.P., Spring, TX (US)

(72) Inventors: Jeffrey Harold Luke, Boise, ID (US); Justin D. Pettingill, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 4 days.

(21) Appl. No.: 18/572,769

(22) PCT Filed: Jul. 9, 2021

(86) PCT No.: PCT/US2021/041021
§ 371 (c)(1),
(2) Date: Dec. 20, 2023

(87) PCT Pub. No.: WO2023/282911
PCT Pub. Date: Jan. 12, 2023

(65) Prior Publication Data

US 2024/0288818 A1 Aug. 29, 2024

(51) Int. Cl.
*G03G 15/00* (2006.01)
*G03G 21/18* (2006.01)

(52) U.S. Cl.
CPC ....... *G03G 15/757* (2013.01); *G03G 21/1857* (2013.01); *G03G 15/5008* (2013.01); *G03G 2221/1657* (2013.01)

(58) Field of Classification Search
USPC ........................................................ 399/167
See application file for complete search history.

(56) References Cited

U.S. PATENT DOCUMENTS

| | | | | |
|---|---|---|---|---|
| 4,719,491 | A * | 1/1988 | Katoh | G03G 15/757 399/75 |
| 8,670,690 | B2 | 3/2014 | Jang et al. | |
| 9,804,560 | B2 | 10/2017 | Sato et al. | |
| 9,817,333 | B2 | 11/2017 | Morioka et al. | |
| 10,139,777 | B2 | 11/2018 | Sato et al. | |
| 10,228,652 | B2 | 3/2019 | Sato et al. | |

(Continued)

FOREIGN PATENT DOCUMENTS

| | | | |
|---|---|---|---|
| EP | 3185078 | A1 | 6/2017 |
| EP | 3726298 | A1 | 10/2020 |

(Continued)

*Primary Examiner* — Quana Grainger
(74) *Attorney, Agent, or Firm* — Foley & Lardner LLP

(57) ABSTRACT

An apparatus includes a developer and an actuator moveable in response to an input stimulus during an image forming operation of an image forming device. The apparatus includes a clutch that is actuatable, during the image forming operation, by the actuator between an engaged position in which the clutch is engaged with a photoreceptor and a disengaged position in which the clutch is disengaged from the photoreceptor. The clutch when in the engaged position transfers a force of a photoreceptor drive assembly to the photoreceptor for moving the photoreceptor, and the clutch when in the disengaged position isolates the photoreceptor drive assembly from the photoreceptor.

16 Claims, 7 Drawing Sheets

(56) References Cited

U.S. PATENT DOCUMENTS

| | | | | |
|---|---|---|---|---|
| 10,564,568 | B2 * | 2/2020 | Jung | G03G 15/5041 |
| 10,678,185 | B2 | 6/2020 | Uneme et al. | |
| 10,712,708 | B2 | 7/2020 | Sato et al. | |
| 2001/0046393 | A1 * | 11/2001 | Uchida | G03G 15/0194 399/167 |
| 2014/0153968 | A1 | 6/2014 | Huck et al. | |
| 2016/0091815 | A1 | 3/2016 | Morgan | |
| 2020/0301352 | A1 | 9/2020 | Matsumaru et al. | |

FOREIGN PATENT DOCUMENTS

| | | | | | |
|---|---|---|---|---|---|
| JP | 62-065049 | A | | 3/1987 | |
| JP | 11-119567 | A | | 4/1999 | |
| JP | 11-153927 | A | | 6/1999 | |
| JP | 2001-337511 | A | | 12/2001 | |
| JP | 2008-170950 | A | | 7/2008 | |
| JP | 4958942 | B2 | | 6/2012 | |
| JP | 2015075690 | A | * | 4/2015 | G03G 15/757 |
| JP | 2019-191553 | A | | 10/2019 | |
| JP | 2021103222 | A | * | 7/2021 | G03G 21/1857 |
| WO | 2014/038644 | A1 | | 3/2014 | |
| WO | 2020/251053 | A1 | | 12/2020 | |

* cited by examiner

CLUTCH ACTUATION BETWEEN POSITIONS

CROSS-REFERENCE TO RELATED APPLICATIONS

This application is a U.S. National Stage Patent Application under 35 U.S.C. § 371 of PCT/US2021/041021, filed Jul. 9, 2021, which is hereby incorporated by reference in its entirety.

BACKGROUND

A printing device can deliver a print material to a print medium to form an image on the print medium. In some examples, a printing device can be an electrophotographic printing device that supplies a toner (which is a type of print material) to an electrostatic latent image formed on a photoreceptor to form a visible toner image on the photoreceptor. The electrophotographic printing device transfers the toner image to a print medium, and then fixes the transferred toner image to the print medium, to form an image on the print medium.

BRIEF DESCRIPTION OF THE DRAWINGS

Some implementations of the present disclosure are described with respect to the following figures.

Figure 1A:
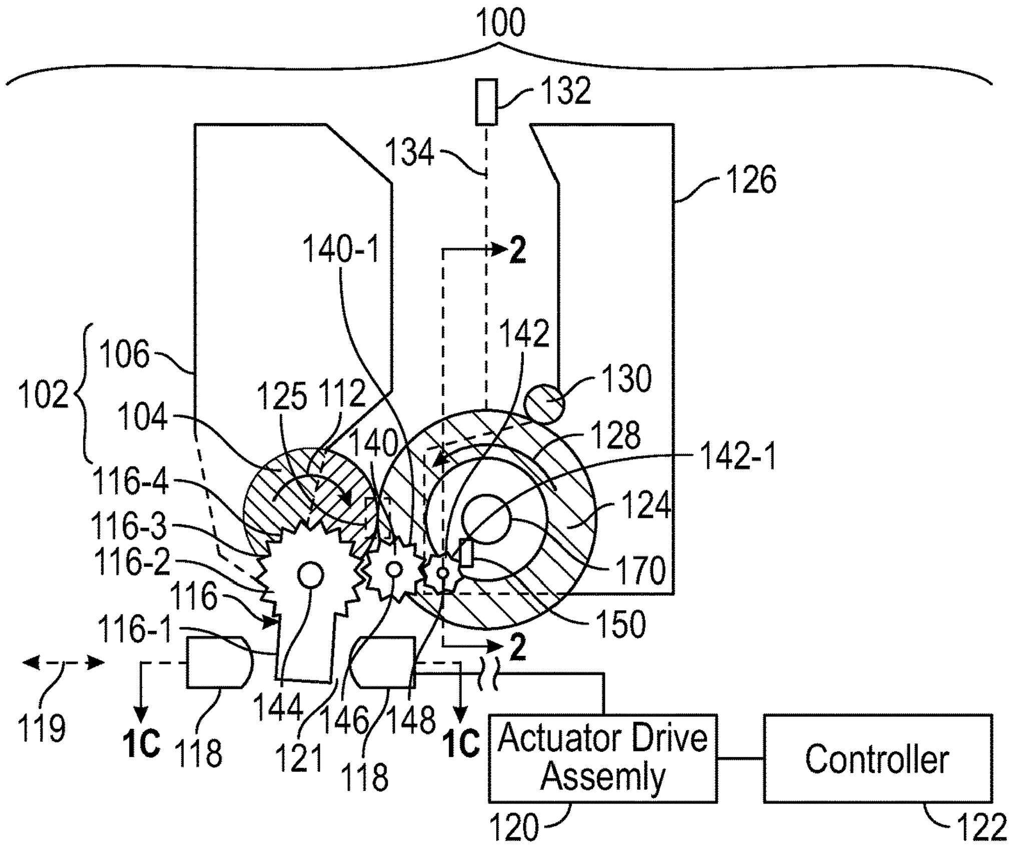
FIGS. 1A-1B are schematic diagrams of a portions of an image forming device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An image forming device such as an electrophotographic printing device can employ a photoreceptor on which an electrostatic latent image is formed, for use in transferring an image to a target medium (e.g., a print medium such as a paper substrate or a substrate of another material). The photoreceptor can be in the form of a photosensitive drum that includes a cylindrical tubular structure and a photosensitive layer on the cylindrical tubular structure.

A charging element can be used to charge a surface of the photosensitive drum to a uniform electrical potential (e.g., a negative electrical potential). In some examples, the charging element can include a charging roller. In other examples, a charging element can be in the form of a corona charger that can charge the surface of the photosensitive drum to a uniform electrical potential without making physical contact with the surface of the photosensitive drum.

A light source (e.g., a laser source, light emitting diode(s) (LEDs), etc.) can be activated by a controller of the image forming device to irradiate selected portions of the charged surface of the photosensitive drum, to form an electrostatic latent image on the photosensitive drum.

A developing device in the image forming device includes a developer (e.g., a developing roller) onto which a developing agent including an electrically charged toner is adhered. During operation of the image forming device, as the developing roller rotates relative to the photosensitive drum (which also rotates in the opposite rotational direction of the developing roller), the developing agent on the developing roller is conveyed to a supply region facing the photosensitive drum. In this supply region, a layer of toner adhered to the surface of the developing roller can be transferred to the photosensitive layer of the photosensitive drum on which the electrostatic latent image has been formed, which develops the electrostatic latent image on the surface of the photosensitive drum to form a visible toner image on the photosensitive drum.

In some examples, the developing device including the developing roller can be part of a cartridge that is removably inserted into the image forming device. The cartridge can include a reservoir containing a toner, and the toner in the reservoir can be transferred to the developing roller.

When the cartridge is inserted into an image forming device, the developing roller is energized by applying a bias voltage to the outer surface of the developing roller. The electrically charged toner in the reservoir of the cartridge is electrically attracted by the bias voltage to the outer surface of the developing roller.

In some cases, the developing roller is continually energized (the bias voltage is continually applied to the developing roller) so long as the cartridge remains inserted in the image forming device and the image forming device is in an active state (e.g., the image forming device is not powered off or in a sleep mode). When the developing roller is energized, rotation of the developing roller continues to attract toner to the developing roller, and in conjunction with a rotation of the photosensitive drum, the toner is transferred to the photosensitive drum.

In some examples, an ability to selectively control whether or not toner can be transferred from the developing roller to the photosensitive drum during an active operation of an image forming device is not available. As a result, a user of the image forming device is not provided with the flexibility to selectively disrupt the transfer of toner from the developing roller to the photosensitive drum while the image forming device is active, such as during an image forming operation (e.g., performed as part of a maintenance of the image forming device, or a test of the image forming device, or during normal use by a customer of the image forming device). The ability to selectively disrupt a transfer of the toner from the developing roller to the photosensitive drum can be useful for various purposes, such as to test the cartridge or the image forming device, to perform maintenance of the cartridge or the image forming device, to check a status of the cartridge or the image forming device, and so forth.

In accordance with some implementations of the present disclosure, techniques or mechanisms are provided to selectively drive or not drive a photoreceptor to control whether or not a toner is transferred from a developer to the photoreceptor. A clutch can be used that is selectively actuatable between an engaged position in which the clutch is engaged with the photoreceptor, and a disengaged position in which the clutch is disengaged from the photoreceptor.

A "clutch" can refer to a moveable member that can move between different positions to engage and disengage, respectively, from a further member (e.g., a photoreceptor), where the clutch when engaged with the further member allows a force (e.g., a torque or another type of force) applied to the clutch to be transferred to the further member, and where the clutch when disengaged from the further member isolates a force applied to the clutch from the further member.

In the ensuing discussion, reference is made to examples in which a developer is in the form of a developing roller, and a photoreceptor is in the form of a photosensitive drum. In other examples, other types of developers and/or photoreceptors can be employed.

Figure 1B:
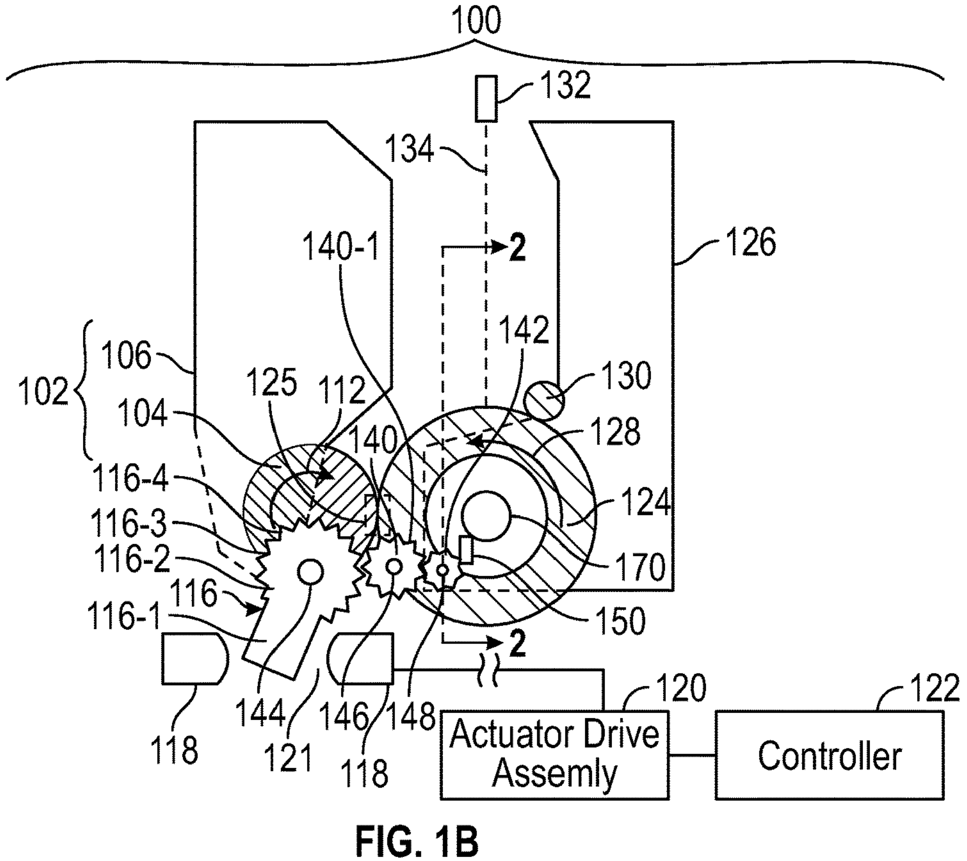

FIGS. 1A-1B illustrate portions of an image forming device 100 including an actuator assembly at respective different states to control a position of a clutch 170 for a photosensitive drum 124 between an engaged position (FIG. 1A) and a disengaged position (FIG. 1B), in accordance with some implementations of the present disclosure. Note that some portions of the image forming device 100 are not shown in FIGS. 1A and 1B for brevity.

Also, although a specific example actuator assembly is depicted in FIGS. 1A-1B, it is noted that in other examples, actuator assemblies for actuating the clutch 170 between different positions can have different arrangements.

The photosensitive drum 124 can be part of a cartridge that further includes a developing device 102. The developing device 102 includes a developing roller 104 and a reservoir 106 as well as other components (not shown).

The developing roller 104 and the photosensitive drum 124 are attached to a housing of the cartridge. As used here, a "housing" can refer to a single housing segment or multiple housing segments that are attached together.

The cartridge is removably insertable into the image forming device 100 in some examples. The cartridge contains a toner (in the reservoir 106) that is to be transferred to the developing roller 104, which in turn transfers the toner to the photosensitive drum 124. A user may remove an existing cartridge and insert a new cartridge into the image forming device 100, such as when the toner of the existing cartridge is depleted.

The reservoir 106 contains a developing agent that includes an electrically charged toner. For example, the developing agent can include the electrically charged toner, a mixture of the electrically charged toner and a liquid carrier, or the toner with carrier particles.

During an image forming operation of the image forming device 100, a bias voltage can be applied to the developing roller 104. The bias voltage is supplied from a voltage source (not shown) of the image forming device 100.

In some examples, a regulator (not shown) of the developing device 102 regulates a thickness of a toner that is adhered to the outer surface of the developing roller 104. The regulator can be in the form of a regulating blade or another type of regulator. A tip of the regulating blade can come into contact or close proximity with the outer surface of the developing roller 104. As the developing roller 104 rotates in a first rotational direction 112, the electrically charged toner is transferred from the reservoir 106 to the outer surface of the developing roller 104 (the electrically charged toner is attracted to the outer surface of the developing roller 104 by the bias voltage applied to the developing roller 104). The regulator sets the thickness of the toner on the developing roller 104 to be uniform as the developing roller 104 rotates. In some examples, the regulator can also be set to the bias voltage from the voltage source.

In FIGS. 1A-1B, the actuator assembly for the clutch 170 includes an actuator 118, a pivot transfer member 116 that is pivotally attached at a pivot point 144 to the cartridge housing, and gears 140, 142, and 150.

The actuator 118 is moved by an actuator drive assembly 120 of the image forming device 100. In some examples, the actuator drive assembly 120 can include a motor, a solenoid mechanism, an assembly of gears, or any other type of assembly that can impart motion on the actuator 118. The actuator drive assembly 120 can be controlled by a controller 122 of the image forming device 100. In some examples, the controller 122 can control image forming operations and/or other operations of the image forming device 100.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In examples according to FIGS. 1A-1B, the actuator 118 slides left and right (in the view of FIGS. 1A-1B) along the axis 119 in response to being driven by the actuator drive assembly 120 under control of the controller 122. In other examples, the actuator 118 can be pivoted, rotated, or caused to have another type of motion based on being driven by the actuator drive assembly 120 under control of the controller 122.

A photosensitive drum 124 is located in close proximity with the developing roller 104 in a supply region 125 where the toner is to be transferred from the developing roller 104 to the photosensitive drum 124. In some examples, an outer surface of the developing roller 104 can make physical contact with the outer surface of the photosensitive drum 124. In other examples, the outer surface of the developing roller 104 is in sufficiently close proximity to the outer surface of the photosensitive drum 124 such the toner that is on the outer surface of the developing roller 104 can be transferred to the outer surface of the photosensitive drum 124 (or more specifically, to the outer surface of a photosensitive layer of the photosensitive drum 124). In some examples, the photosensitive drum 124 is rotatably supported by a support 126.

Figure 1C:
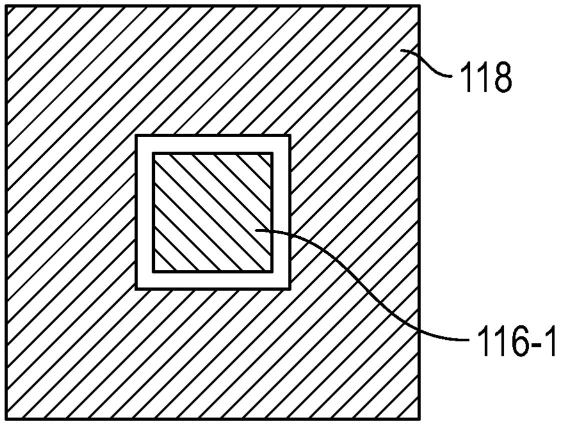
FIG. 1C is a cross-sectional view of an actuator of an actuator assembly, according to some examples.

The pivot transfer member 116 of the actuator assembly has a lever (in the form of a stem 116-1) that is received in a receptacle 121 of the actuator 118. Movement of the actuator 118 along an axis 119 causes a pivoting motion of the pivot transfer member 116 about the pivot point 144. The actuator 118 engages the stem 116-1 to cause a rotation of the pivot transfer member 116 about the pivot point 144. FIG. 1C shows a cross-sectional view of the actuator 118 taken along section 1C-1C in FIG. 1A. The actuator 118 is generally ring-shaped (a square ring in the example shown in FIG. 1C, although other shapes can be used in other examples). The opening in the center corresponds to the receptacle 121 of FIGS. 1A-1B. In other examples, the actuator 118 does not surround all sides of the stem 116-1 of the pivot transfer member 116.

The pivot transfer member 116 further includes an enlarged segment 116-2 that has a general profile of half a disk. The enlarged segment 116-2 is attached to the stem 116-1, and has a generally curved outer surface 116-3 on which a teeth profile 116-4 is formed. The rotation of the pivot transfer member 116 due to movement of the actuator 118 causes a corresponding rotation of the teeth profile 116-4.

The teeth profile 116-4 of the enlarged segment 116-2 engages with a teeth profile 140-1 of the gear 140.

The gear 140 is pivotally mounted to the cartridge housing at a pivot point 146. Rotation of the gear 140 (in response to engagement of the teeth profiles 116-4 and 140-1 and the rotation of the pivot transfer member 116) would cause rotation of the gear 140 about the pivot point 146.

The teeth profile 140-1 of the gear 140 engages with a teeth profile 142-1 of the gear 142. The gear 142 is pivotally mounted to the cartridge housing at a pivot point 148. The gear 142 is rotatable about the pivot point 148 in response to engagement of the teeth profiles 140-1 and 142-1 and the rotation of the gear 140.

As noted above, the developing device 102, the actuator assembly (that includes the actuator 118, the pivot transfer member 116 and the gears 140, 142, and 150), and the photosensitive drum 124 can be part of a removable cartridge that is removably mounted in the image forming device 100. The cartridge has a housing in which or to which the developing device 102, the actuator assembly, and the photosensitive drum 124 are located or attached. The housing of the cartridge can include the support 126, the housing of the developing device 102, and other housing segments (not shown).

During an image forming operation, the photosensitive drum 124 is rotated in a second rotational direction 128, which is opposite the first rotational direction 112 of the developing roller 104. For example, the first rotational direction 112 is a clockwise direction, while the second rotational direction 128 is a counterclockwise direction (or vice versa).

As further shown in FIG. 1A, an imaging charging element 130 when energized is used to charge the outer surface of the photosensitive drum 124 to a uniform electric potential. The imaging charging element 130 can include a charging roller or a corona charger, according to some examples.

The image forming device 100 further includes a light source 132 to irradiate selected portions of the electrically charged outer surface of the photosensitive drum 124 with light 134. The light 134 emitted from the light source 132 is modulated according to image data received by the controller 122. The image data defines the image to be formed on a target medium 136, such as a print substrate. Note that the light source 132 is external of the cartridge and is part of the image forming device 100.

In some examples, the gear 142 is a helix gear. A helix gear has slanted teeth traces in the teeth profile 142-1.

The helix gear 142 is engaged with the gear 150, which is also a helix gear. The helix gear 150 is oriented generally perpendicularly to the helix gear 142. Even though the helix gears 142 and 150 are arranged generally perpendicularly to one another, the slanted teeth traces of the teeth profile 142-1 and a teeth profile 150-1 (FIG. 2A) of the helix gear 150 allows rotation of the helix gear 142 to drive a corresponding rotation of the helix gear 150. In the position of the actuator 118 shown in FIG. 1A, the actuator assembly is in a first state that corresponds to the clutch 170 being engaged with the photosensitive drum 124.

Figure 2A:
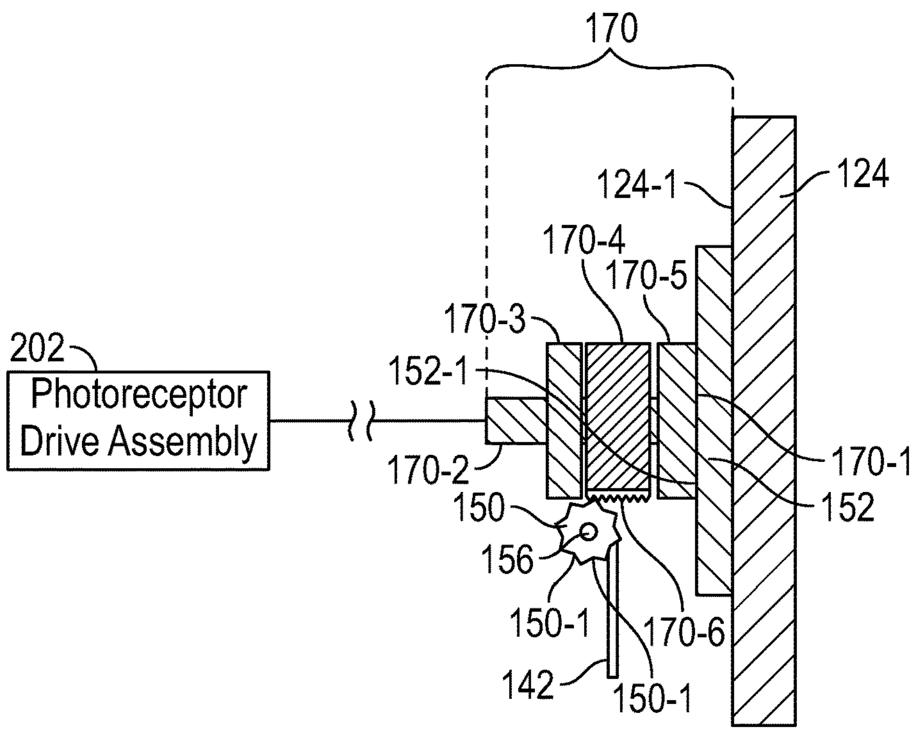
FIGS. 2A-2D illustrate an actuator assembly and a photosensitive drum, in accordance with some examples.

As shown in FIG. 2A, when the actuator assembly is in the state of FIG. 1A, an engagement surface 170-1 of the clutch 170 engages a corresponding surface 152-1 of an engagement member 152 that is fixedly attached to a surface of the photosensitive drum 124. The engagement member 152 can be integrally formed with the photosensitive drum 124, or alternatively, can be separate from but attached to the surface 124-1 of the photosensitive drum 124.

In other examples, the engagement surface 170-1 of the clutch 170 in the engaged position can engage with a corresponding surface of the photosensitive drum 124, rather than the engagement member 152.

Figure 2B:
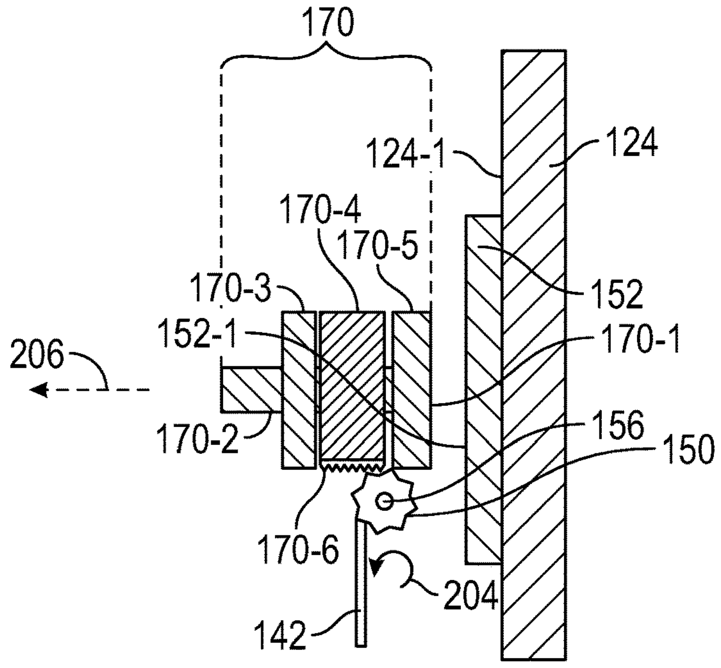
Figure 2C:
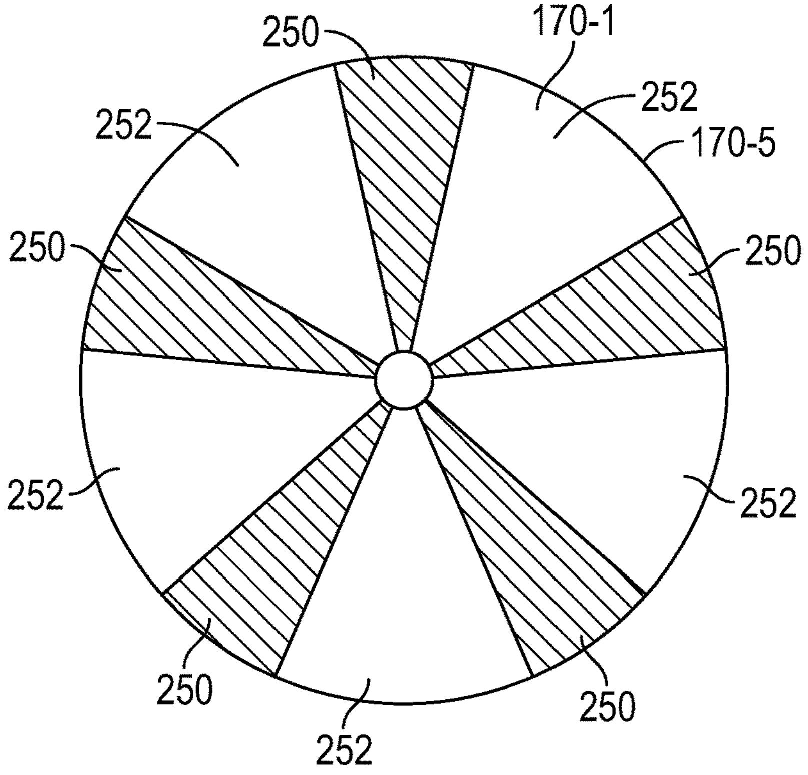

In some examples, as shown in FIG. 2C, the engagement surface 170-1 of the ring-shaped member 170-5 on the clutch 170 can have a teeth profile, such as an arrangement of ridges of teeth (250) and valleys (252) between the ridges of teeth (250). The ridges of teeth 250 and the valleys 252 can extend radially from the center of the engagement surface 170-1 to engage a corresponding teeth profile valleys and ridges of teeth on the corresponding surface 152-1 of the engagement member 152. When engaged, the corresponding ridges of teeth and valleys can allow for a rotation of the engagement surface 170-1 of the clutch 170 to cause a corresponding rotation of the engagement member 152.

Figure 2D:
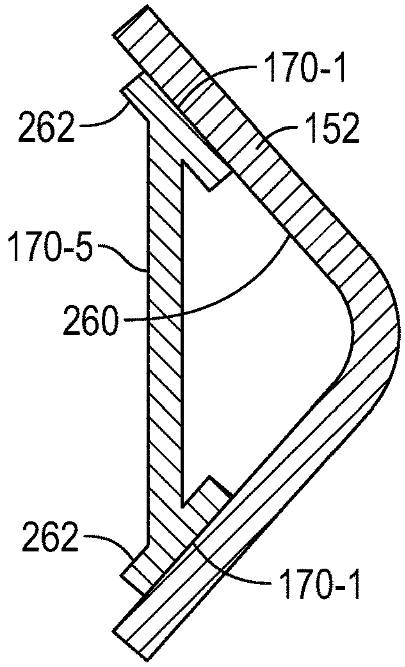

In other examples, as shown in FIG. 2D, the engagement member 152 of the photosensitive drum 124 can have a generally cone shape with an inner cone surface 260 to receive the ring-shaped member 170-5. In this example, the engagement surface 170-1 of the clutch 170 is on engagement pads 262 of the ring-shaped member 170-5.

The clutch 170 includes a drive shaft 170-2 that is rotatably drivable by a photoreceptor drive assembly 202. The photoreceptor drive assembly 202 can include a motor, a solenoid mechanism, an assembly of gears, or any other type of assembly that can impart rotational motion of the drive shaft 170-2. When the photoreceptor drive assembly 202 rotates the drive shaft 170-2, the photosensitive drum 124 is rotated accordingly when the clutch 170 is engaged with the engagement member 152.

In examples according to FIG. 2A, three ring-shaped members 170-3, 170-4, and 170-5 are mounted on the drive shaft 170-2. In examples according to FIG. 2A, the drive shaft 170-2 extends through the inner openings of the ring-shaped members 170-3, 170-4, and 170-5.

The bottom of the intermediate ring-shaped member 170-4 has a teeth profile 170-6. The teeth profile 170-6 engages the teeth profile 150-1 of the helix gear 150.

Although FIG. 2A shows an example where three ring-shaped members are mounted on the drive shaft 170-2, in other examples, a different number of ring-shaped members can be mounted on the drive shaft 170-2.

In operation, assuming that the actuator assembly is in the state shown in FIG. 1A, the clutch 170 is in its engaged position and is engaged with the engagement member 152 of the photosensitive drum 124. As a result, when the photoreceptor drive assembly 154 is operated (such as under control by the controller 122), the photoreceptor drive assembly 154 rotates the drive shaft 170-2 to impart a rotational movement of the photosensitive drum 124 (such as in the rotational direction 128 shown in FIG. 1A).

To move the clutch 170 to its disengaged position, the controller 122 can cause the actuator drive assembly 120 to move the actuator 118 to the left (in the view of FIGS.

1A-1B), to cause a rotation in the clockwise direction of the pivot transfer member 116 about the pivot point 144.

The rotation of the pivot transfer member 116 in the clockwise direction causes a rotation of the gear 140 about the pivot point 146 in the counterclockwise direction.

The rotation of the gear 140 in the counterclockwise direction causes a rotation of the gear 142 about the pivot point 148 in the clockwise direction.

As further shown in FIGS. 2A-2B, the rotation of the gear 142 in the clockwise direction causes a rotation of the helix gear 150 about the pivot point 156 in the counterclockwise direction, as indicated by rotational arrow 204.

In other examples, the pivot transfer member 116 and the gears 140, 142, and 150 can have different rotational directions during an image forming operation.

Based on the engagement of the teeth profile 150-1 of the helix gear 150 and the teeth profile 170-6 at the bottom of the intermediate ring-shaped member 170-4, the rotation of the helix gear 150 in the counterclockwise direction 204 causes the intermediate ring-shaped member 170-4 to move away from the engagement member 152 of the photosensitive drum 124 in a direction 206, as shown in FIG. 2B. The movement of the ring-shaped member 170-4 in the direction 206 caused by the counterclockwise rotation of the helix gear 150 results in the clutch 170 moving in the direction 206, such that the engagement surface 170-1 of the clutch 170 is moved away from the corresponding engagement surface 152-1 of the engagement member 152.

In the position shown in FIG. 2B, the clutch 170 is in the disengaged position. As a result, when the photoreceptor drive assembly 202 (shown in FIG. 2A but not shown in FIG. 2B) rotates the drive shaft 170-2, the rotational motion of the clutch 170 is not transferred to the photosensitive drum 124, such that the photosensitive drum 124 is not rotating (remains stationary) even when the photoreceptor drive assembly 202 is actively rotating the drive shaft 170-2 of the clutch 170.

Since the photosensitive drum 124 is not rotating, the developing roller 104 is unable to form an electrostatic latent image on the photosensitive drum 124 for producing a target image based on image data received by the controller 122. This effectively disrupts (e.g., disables) the transfer of the toner from the developing roller 104 to the photosensitive drum 124, such as during an image forming operation.

To move the clutch 170 from the disengaged position of FIG. 2B to the engaged position of FIG. 2A, the controller 122 controls the actuator drive assembly 120 to move the actuator 118 to the right (in the view of FIGS. 1A-1B), which causes rotations of the following elements to move the clutch 170 back into engagement with the photosensitive drum 124: the pivot transfer member 116, the gear 140, the helix gear 142, and the helix gear 150.

Figure 3A:
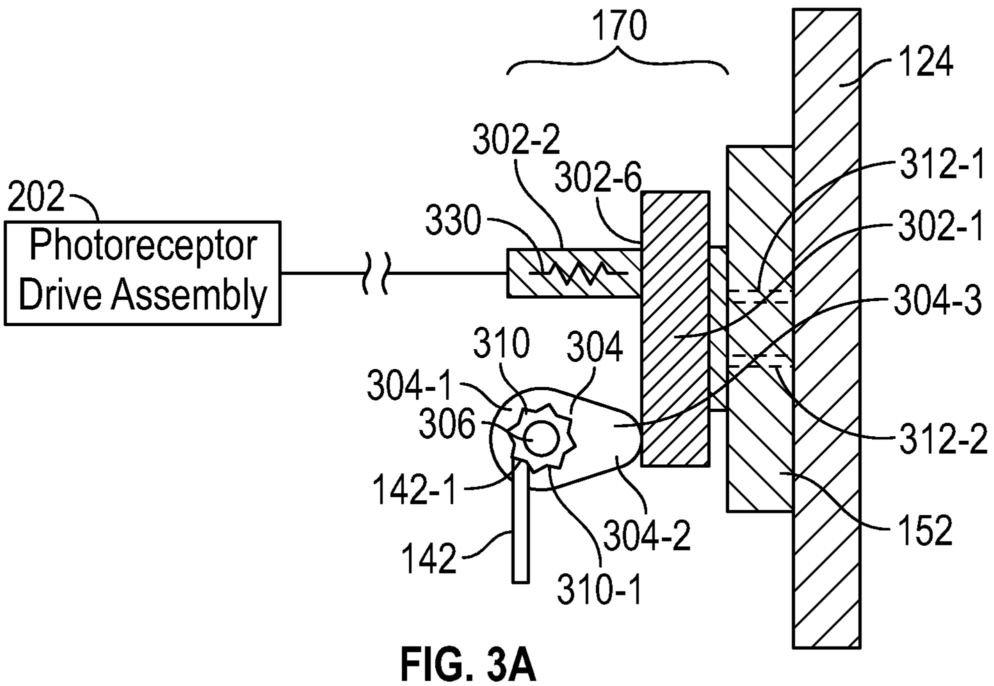
FIGS. 3A-3B illustrate an actuator assembly and a photosensitive drum, in accordance with further examples.
Figure 3B:
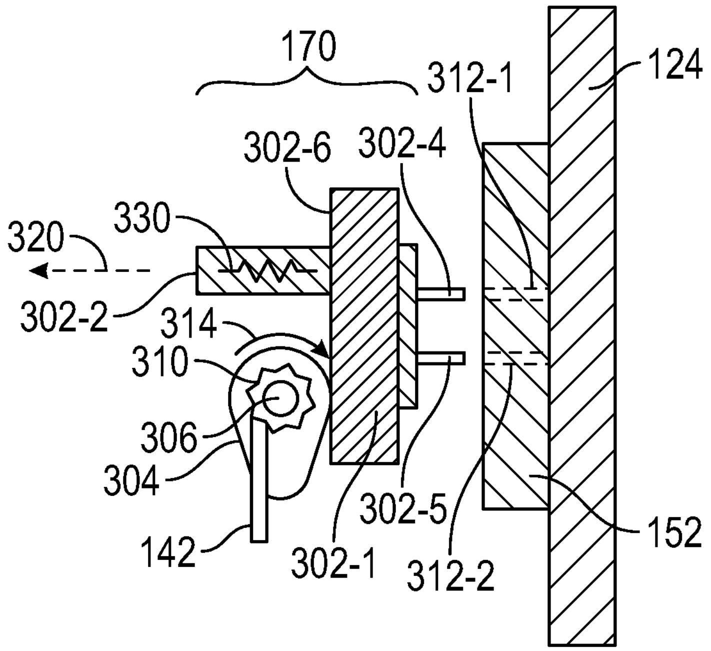

FIGS. 3A-3B show a different example in which a cam mechanism is used instead of the helix gear 150 of FIGS. 2A-2B for operating the clutch 170. In FIGS. 3A-3B, the teeth profile 142-1 of the gear 142 engages with a teeth profile 310-1 of a gear 310 that is fixedly attached to a cam 304. The cam 304 and the gear 310 fixedly attached to the cam 304 are rotatable about a pivot point 306.

The clutch 170 is movable between an engaged position (FIG. 3A) and a disengaged position (FIG. 3B).

The cam 304 has generally a teardrop shape with an enlarged portion 304-1 and a narrow portion 304-2. As a result, the cam 304 has an angled surface 304-3 that can make contact with a ring-shaped member 302-1 of the clutch 170. The ring-shaped member 302-1 is mounted on a drive shaft 302-2 of the clutch 170. The drive shaft 302-2 extends through an inner opening of the ring-shaped member 302-1.

As better seen in FIG. 3B, an end portion of the clutch 170 that is closest to the engagement member 152 has protrusions 302-4 and 302-5, such as in the form of spring tips. A "spring tip" is a protrusion that can be deflected by a force applied on the protrusion. Protrusions 302-4 and 302-5 are to be inserted into openings 312-1 and 312-2 of the engagement member 152 attached to the photosensitive drum 124.

The protrusions 302-4 and 302-5 implemented as spring tips allows for misalignment of the protrusions 302-4 and 302-5 and the respective openings 312-1 and 312-2 while still being able to push the protrusions 302-4 and 302-5 into the respective openings 312-1 and 312-2. If the openings 312-1 and 312-2 and the spring tips are not aligned when the cam 304 engages the ring-shaped member 302-1 to push the spring tips against the engagement member 152, the spring tips would give, and once the drive shaft 302-2 starts to turn, the spring tips would align with the openings 312-1 and 312-2 and transfer rotation. In other examples, the openings 312-1 and 312-2 can include beveled openings to align with the protrusions 302-4 and 302-5.

When the protrusions 302-4 and 302-5 are inserted into the openings 312-1 and 312-2, respectively, the clutch 170 is engaged with the engagement member 152. When the actuator assembly is actuated between different states, the gear 310 of the cam 304 is caused to be rotated in a clockwise direction (as indicated by a rotational arrow 314), which causes the cam 304 to be rotated about the pivot point 306 from the position shown in FIG. 3A to the position shown in FIG. 3B.

To cause the clockwise rotation of the cam 304, a slightly different variation of the actuator assembly from that depicted in FIGS. 1A-1B is employed. For example, the actuator assembly can be in the position of FIG. 1B to cause the cam 304 to be in the position shown in FIG. 3A, and the actuator assembly can be in the position shown in FIG. 1A to cause the cam 304 to be in the position shown in FIG. 3B.

In the position of FIG. 3A, the narrow portion 304-2 of the cam 304 pushes against an engagement surface 302-6 of the ring-shaped member 302-1, to move the protrusions 302-4 and 302-5 of the clutch 170 into the openings 312-1 and 312-2, respectively.

When the cam 304 rotates in the clockwise direction 314 such that the narrow portion 304-2 is no longer engaged to the engagement surface 302-6 of the ring-shaped member 302-1, an internal spring 330 in the clutch 170 can push the drive shaft 302-2 and correspondingly, the clutch 170 away from the engagement member 152 in a direction 320. This causes the clutch 170 to move to its disengaged position in which the protrusions 302-4 and 302-5 are not inserted into the openings 312-1 and 312-2, and thus, the clutch 170 is disengaged from the photosensitive drum 124. The cam 304 when actuated from a first cam position to a second cam position (e.g., from FIG. 3B to FIG. 3A) pushes the clutch 170 in the direction from a first clutch position to a second clutch position against a biasing force of the internal spring 330.

Figure 4:
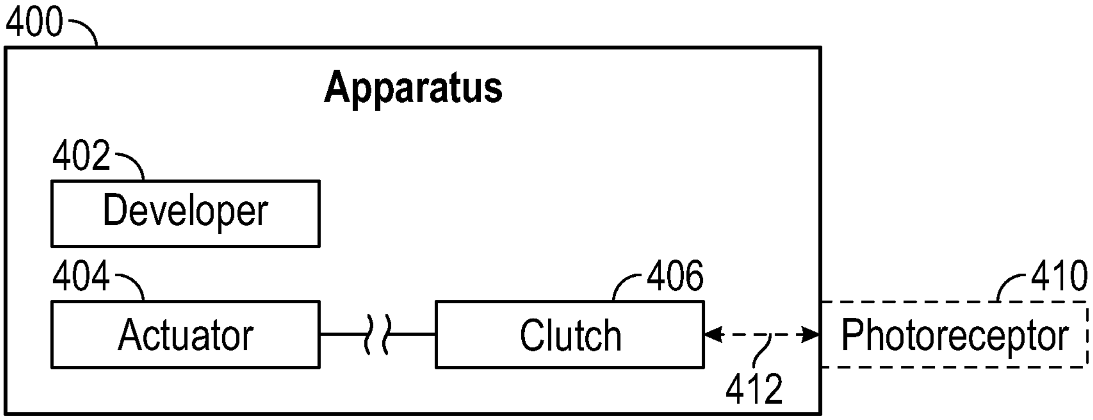
FIG. 4 is a block diagram of an apparatus according to some examples.

FIG. 4 is a block diagram of an apparatus 400 (e.g., a cartridge or a part of the cartridge) that includes a developer 402 (e.g., the developing roller 104 of FIGS. 1A-1B). The apparatus 400 includes an actuator 404 (e.g., the actuator 118 of FIGS. 1A-1B) moveable in response to an input stimulus (e.g., provided by the actuator drive assembly 120) during an image forming operation of an image forming device.

The apparatus 400 includes a clutch 406 (e.g., the clutch 170 discussed above) actuatable (412), during the image forming operation, by the actuator 404 between an engaged position in which the clutch 406 is engaged with a photoreceptor 410 and a disengaged position in which the clutch 406 is disengaged from the photoreceptor 410. The clutch 406 when in the engaged position is to transfer a force of a photoreceptor drive assembly to the photoreceptor 410 for moving the photoreceptor 410, and the clutch 406 when in the disengaged position to isolate the photoreceptor drive assembly from the photoreceptor 410.

In some examples, the photoreceptor 410 remains stationary during the image forming operation when the clutch 406 is in the disengaged position.

In some examples, in the engaged position an engagement surface of the clutch 406 is engaged with a corresponding surface of the photoreceptor 410, and in the disengaged position the engagement surface of the clutch 406 is spaced apart from the corresponding surface of the photoreceptor 410. each of the engagement surface of the clutch and the corresponding surface of the photoreceptor includes a respective teeth profile, as shown in FIG. 2C.

In further examples, an engagement surface of the clutch or the corresponding surface of the photoreceptor 410 includes a cone-shaped surface, such as shown in FIG. 2D.

In some examples, the apparatus 400 includes an actuator assembly that includes the actuator 404 and a gear (e.g., FIGS. 2A-2B) rotatable in response to a movement of the actuator 404, where a rotation of the gear is to cause a translation of the clutch 406 between the engaged position and the disengaged position.

In further examples, the apparatus 400 includes an actuator assembly that includes the actuator 404 and a cam (e.g., FIGS. 3A-3B) moveable in response to a movement of the actuator 404, where the cam is to push the clutch 406 in a direction relative to the clutch in response to a movement of the cam.

In some examples, the clutch 406 includes a biasing element (an internal spring), where cam when actuated from a first cam position to a second cam position pushes the clutch in the direction from a first clutch position to a second clutch position against a biasing force of the biasing element. The biasing element is to return the clutch from the second clutch position to the first clutch position in response to actuation of the cam from the second cam position to the first cam position.

Figure 5:
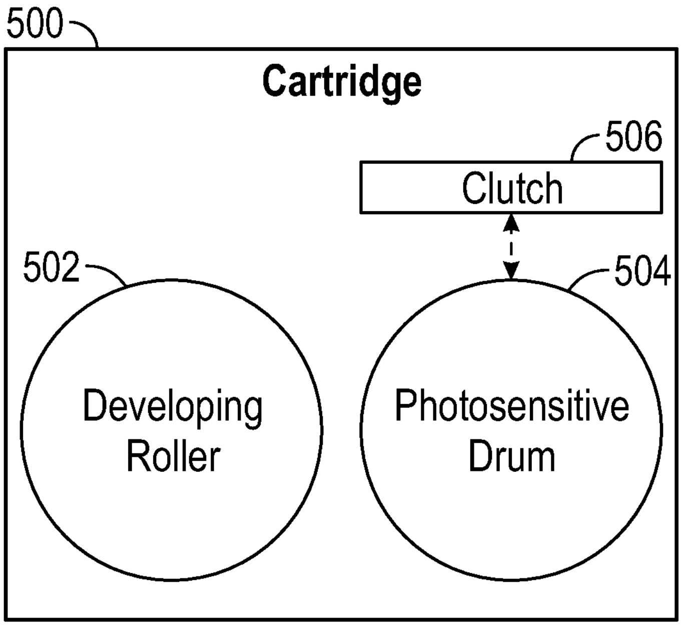
FIG. 5 is a block diagram of a cartridge for an image forming device, according to some examples.

FIG. 5 is a block diagram of a cartridge 500 that includes a developing roller 502 and a photosensitive drum 504. The developing roller 502 is to transfer a toner to the photosensitive drum 504.

The cartridge 500 includes a clutch 506 actuatable, in response to an input stimulus of an image forming device during an image forming operation of the image forming device, between an engaged position in which the clutch 506 is engaged with the photosensitive drum 504 and a disengaged position in which the clutch 506 is disengaged from the photosensitive drum 504. The clutch 506 when in the engaged position transfers a force of a photosensitive drum drive assembly to the photosensitive drum 504 for moving (e.g., rotating) the photosensitive drum 504, and the clutch 506 when in the disengaged position disengages the photosensitive drum drive assembly from the photosensitive drum 504 so that the photosensitive drum 504 remains stationary during the image forming operation.

In some examples, the cartridge 500 further includes an actuator moveable by an actuator drive assembly of the image forming device, and a motion transfer assembly to transfer a motion of the actuator to a corresponding motion of the clutch. The motion transfer assembly can include the actuator assembly of FIGS. 1A-1B, for example.

Figure 6:
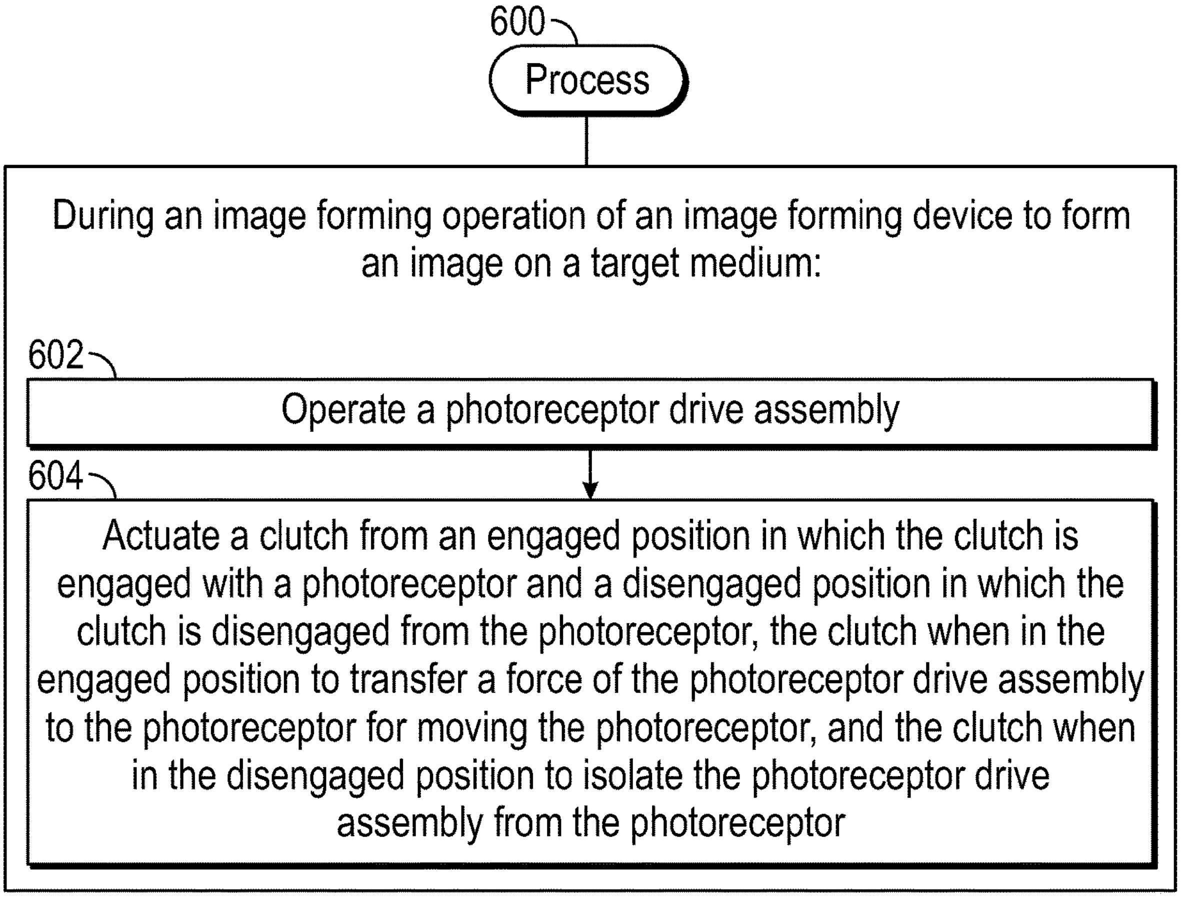
FIG. 6 is a flow diagram of a process according to some examples.

FIG. 6 is a flow diagram of a process 600 according to some examples. During an image forming operation of an image forming device to form an image on a target medium, the process 600 operates (at 602) a photoreceptor drive assembly, and actuates (at 604) a clutch from an engaged position in which the clutch is engaged with a photoreceptor and a disengaged position in which the clutch is disengaged from the photoreceptor, the clutch when in the engaged position to transfer a force of the photoreceptor drive assembly to the photoreceptor for moving the photoreceptor, and the clutch when in the disengaged position to isolate the photoreceptor drive assembly from the photoreceptor.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:

a developer;

an actuator moveable in response to an input stimulus during an active operation of an image forming device; and a clutch actuatable, during the active operation of the image forming device, by the actuator between an engaged position in which the clutch is engaged with a photoreceptor and a disengaged position in which the clutch is disengaged from the photoreceptor, the clutch when in the engaged position to transfer a force of a photoreceptor drive assembly to the photoreceptor for moving the photoreceptor, and the clutch when in the disengaged position to isolate the photoreceptor drive assembly from the photoreceptor, wherein the photoreceptor remains stationary during the active operation of the image forming device when the clutch is in the disengaged position while the photoreceptor drive assembly is actively operating.

2. The apparatus of claim 1, wherein in the engaged position an engagement surface of the clutch is engaged with a corresponding surface of the photoreceptor, and wherein in the disengaged position the engagement surface of the clutch is spaced apart from the corresponding surface of the photoreceptor.

3. The apparatus of claim 2, wherein each of the engagement surface of the clutch and the corresponding surface of the photoreceptor comprises a respective teeth profile.

4. The apparatus of claim 2, wherein the engagement surface of the clutch or the corresponding surface of the photoreceptor comprises a cone-shaped surface.

5. The apparatus of claim 1, comprising:

an actuator assembly that comprises the actuator and a gear rotatable in response to a movement of the actuator, wherein a rotation of the gear is to cause a translation of the clutch between the engaged position and the disengaged position.

6. The apparatus of claim 5, wherein the gear has a teeth profile to engage a corresponding teeth profile of the clutch.

7. The apparatus of claim 1, comprising:

an actuator assembly that comprises the actuator and a cam moveable in response to a movement of the actuator, wherein the cam is to push the clutch in a direction relative to the clutch in response to a movement of the cam.

8. The apparatus of claim 7, wherein the clutch comprises a biasing element, the cam when actuated from a first cam position to a second cam position to push the clutch in the direction from a first clutch position to a second clutch position against a biasing force of the biasing element.

9. The apparatus of claim 8, wherein the biasing element is to return the clutch from the second clutch position to the first clutch position in response to actuation of the cam from the second cam position to the first cam position.

10. A cartridge comprising:

a developing roller;

a photosensitive drum, wherein the developing roller is to transfer a toner to the photosensitive drum; and a clutch actuatable, in response to an input stimulus of an image forming device during an active operation of the image forming device, between an engaged position in which the clutch is engaged with the photosensitive drum and a disengaged position in which the clutch is disengaged from the photosensitive drum, the clutch when in the engaged position to transfer a force of a photosensitive drum drive assembly to the photosensitive drum for moving the photosensitive drum, and the clutch when in the disengaged position to disengage the photosensitive drum drive assembly from the photosensitive drum so that the photosensitive drum remains stationary during the active operation of the image forming device while the photosensitive drum drive assembly continues to operate.

11. The cartridge of claim 10, further comprising:

an actuator moveable by an actuator drive assembly of the image forming device; and a motion transfer assembly to transfer a motion of the actuator to a corresponding motion of the clutch.

12. The cartridge of claim 10, wherein the clutch comprises a protrusion to engage a receptacle of the photosensitive drum.

13. A method comprising:

during an active operation of an image forming device to form an image on a target medium:

operating a photoreceptor drive assembly; and actuating a clutch from an engaged position in which the clutch is engaged with a photoreceptor and a disengaged position in which the clutch is disengaged from the photoreceptor, the clutch when in the engaged position to transfer a force of the photoreceptor drive assembly to the photoreceptor for moving the photoreceptor, and the clutch when in the disengaged position to isolate the photoreceptor drive assembly from the photoreceptor, wherein the photoreceptor remains stationary during the active operation of the image forming device when the clutch is in the disengaged position while the photoreceptor drive assembly continues to operate.

14. The method of claim 13, wherein in the engaged position an engagement surface of the clutch is engaged with a corresponding surface of the photoreceptor, and wherein in the disengaged position the engagement surface of the clutch is spaced apart from the corresponding surface of the photoreceptor.

15. The cartridge of claim 10, wherein the clutch includes a ring-shaped member having an engagement surface with a teeth profile to engage a corresponding teeth profile on the photosensitive drum.

16. The method of claim 13, wherein actuating the clutch comprises:

moving an actuator that causes rotation of a gear assembly; and translating the clutch between the engaged position and the disengaged position in response to the rotation of the gear assembly.

* * * * *